Feb. 12, 1924. 1,483,613
M. PAYNE
MEANS FOR COUPLING VEHICLES
Filed March 6, 1923   2 Sheets-Sheet 1
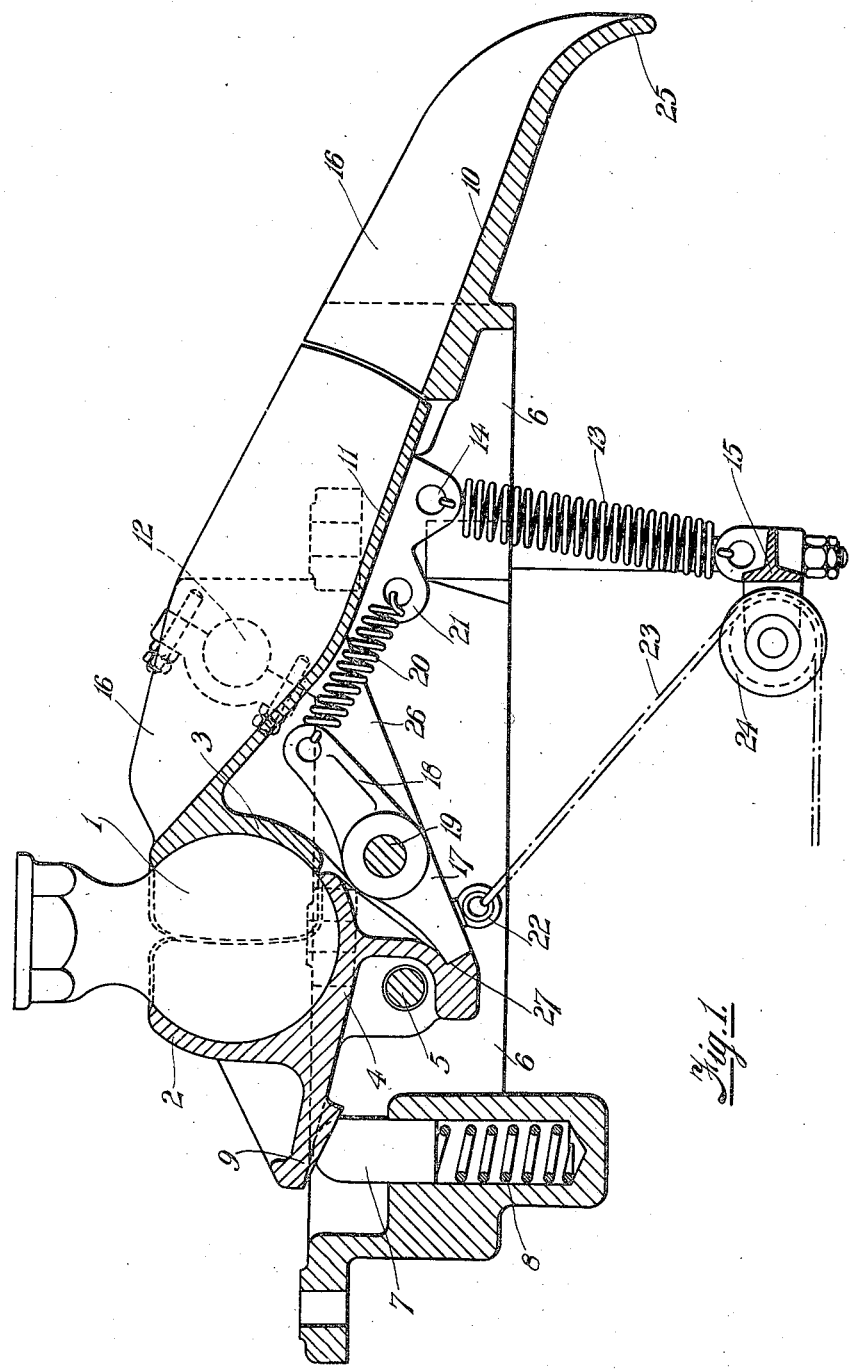

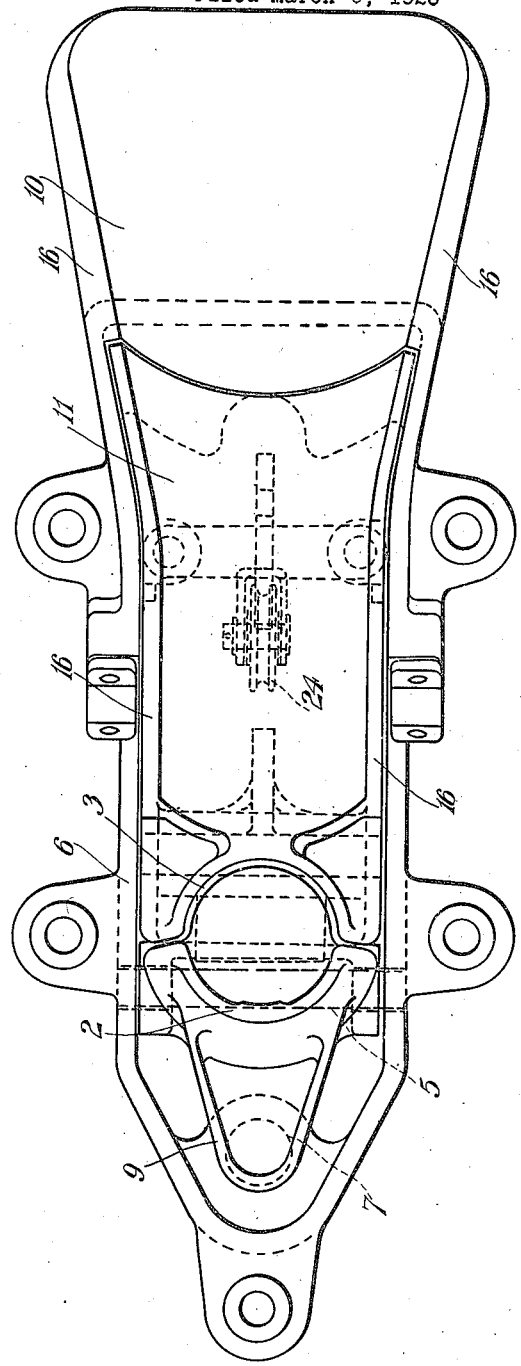

Patented Feb. 12, 1924.

1,483,613

UNITED STATES PATENT OFFICE.

MATT PAYNE, OF LONDON, ENGLAND.

MEANS FOR COUPLING VEHICLES.

Application filed March 6, 1923. Serial No. 623,256.

*To all whom it may concern:*

Be it known that I, MATT PAYNE, a subject of the King of Great Britain, of 125 High Holborn, London, W. C. 1, England, have invented new and useful Improvements in Means for Coupling Vehicles, of which the following is a specification.

This invention relates to a method of and means for coupling vehicles and has especial although not exclusive reference to road transport vehicles of that kind in which a tractor as a four wheeled unit is adapted to be coupled to a trailer having two wheels.

The object of this invention is to provide an improved form of universal coupling for vehicles of the ball and socket type wherein the arrangement is such that the ball member is self centering when presented to the socket, the coupling thus constituted being automatic in operation when a tractor for example is backed on to a trailer.

According to the invention a device for coupling vehicles is provided wherein a ball member carried by one vehicle is adapted to be guided into and engaged by a socket formed in two or more parts carried by another vehicle when the two vehicles are brought together for the purpose of coupling said vehicles automatically. The socket is preferably formed in two parts the rear one of which is formed integral with a rearwardly extending hinged flap which is depressed by the passage of the ball member thereover to open the socket. The forward portion of the socket may be mounted to yield resiliently when engaged by the ball member to allow the hinged flap to rise and close the socket, whilst the hinged flap preferably carries a locking member which maintains the socket parts in operative position as long as the hinged flap is in raised position, but which can be released by manually operated means when the vehicles are to be uncoupled.

Reference will now be made to the accompanying drawings which illustrate by way of example a coupling constructed according to the invention and in which:—

Figure 1 is a sectional elevation, and

Figure 2 is a plan.

In the drawings 1 is a spherical member extending downwardly from the forepart of a trailer vehicle and adapted to be engaged by a spherical cavity formed by co-operating members 2 and 3 carried by a tractor vehicle. The member 2 of the spherical cavity is formed as part of a bracket 4 pivoted at 5 to the frame work 6 of the tractor and is urged normally in a direction to engage the member 1 by a plunger 7 acting under the influence of a spring 8 against the under-side of an arm 9 forming part of the bracket 4.

The rear portion 3 of the socket is disposed at the apex of a downwardly inclined flap of substantially triangular shape in plan extending rearwardly of the vehicle. The outer portion 10 of this flap is formed integral with or secured to the framework 6 of the tractor and is provided with a downwardly curving lip 25 at its extremity as shown. The inner portion 11 of the flap whilst providing an inclined surface normally continuous with that of the outer portion 10 is pivotally mounted at 12 so that the rear portion 3 of the socket which is carried by the flap portion 11 may be rocked out of the position shown in Figure 1 to enable the member 1 to enter or leave the socket. The portion 11 of the flap is maintained in the position shown by a spring 13 engaging its under surface at 14 and anchored at its opposite end to a bracket 15 fixed to the tractor framework 6.

The socket as a whole is preferably divided vertically in a direction at right angles to the longitudinal axis of the tractor to form the members 2 and 3, the line of division becoming a horizontal one towards the base of the socket in order the better to receive the downward thrust of the ball member 1.

Both flap portions 10 and 11 are provided with side walls 16 converging towards the socket, 2, 3, to act as guides for the member 1 when tractor and trailer are being coupled together as hereinafter described.

Beneath the spherical socket 2, 3, two arms 17 and 18 rigidly connected together are pivotally mounted on a stub shaft 19 carried in cheeks 26 extending downwardly from the inner flap member 11. The arm 17 is adapted normally to engage a notch or seating 27 formed near the lower end of the bracket 4 and is urged in a direction to continue such engagement by a spring 20 connected to the outer end of arm 18 and to a lug 21 formed on the under side of the inner flap portion 11. The arm 17 is provided near its outer end with an eye 22 to which is connected one end of a cable or chain 23 which passes around a pulley 24 mounted in the bracket 15, and is connected at its other end to suitable hand or foot operating means mounted adjacent the driver's seat.

The operation of the invention is as follows:—

When a tractor is to be coupled to a trailer the operation of backing the tractor under the trailer causes the lip 25 to be presented to the ball member 1 which rides over the lip and up the flap 10. As the ball member rides over the inner flap portion 11 this is depressed causing expansion of the spring 13 until the ball member engages the forward portion 2 of the socket which is pressed forwardly around its pivot 5 causing the spring 8 to be compressed. When the ball has travelled completely off the inner portion 11 of the flap, the latter is freed to rise to the normal position shown in Figure 1, owing to the contraction of spring 13 whilst the reaction of spring 8 when the rearward movement of the tractor is stopped causes the bracket 4 to return to normal position and the member 2 to engage closely around the ball 1 in which position it is locked to the inner flap portion 11 to form the complete socket by re-engagement of the arm 17 with the notch 27 under the influence of the spring 20.

To uncouple the vehicles a pull is exerted on the cable 23 to release the arm 17 from the notch 27, such pull being continued until the inner flap portion 11 is sufficiently depressed to allow the ball member 1 to ride over it when movement of the tractor commences.

Various modifications may be made in the construction above described without departing from the invention. For example the socket may be formed in three portions instead of in two, the forward and rearward portions functioning as above described but cooperating with a normally fixed but readily renewable base portion, whilst the plunger 7 may be arranged horizontally instead of vertically.

Where a six wheeled vehicle of the kind above referred to is provided on the trailer portion with auxiliary wheels at the forward end which are raised to inoperative position whilst the trailer portion is coupled, the arrangements for disconnecting the parts 2 and 3 of the socket may also serve to lower the said auxiliary wheels. The pull exerted through the cable 23 to depress the inner flap portion 11 for uncoupling purposes may be utilized through lever or like connections between the flap and the auxiliary wheel framework to extend the latter, the connection ceasing automatically when said frame work is fully extended.

I claim:—

1. A device for coupling vehicles, comprising a ball member depending from one vehicle, a ball socket on another vehicle having a movable portion, and a movable inclined guide for guiding said ball member into said socket, said movable portion of the ball socket being carried by said movable inclined guide.

2. A device for coupling vehicles according to claim 1 the ball socket having a rearward portion mounted on the movable inclined guide and a forward portion wherein the forward portion of the socket is adapted to yield resiliently when engaged by the ball member to allow said movable inclined guide to rise under spring influence and close the socket.

3. A device for coupling vehicles according to claim 2 wherein the two parts of the socket are locked together by a member carried by the movable inclined guide when the latter is in its raised position and manually operated mechanism is provided to release said locking member and allow uncoupling of the vehicles.

4. A device for coupling vehicles comprising a ball member depending from the vehicle, a ball socket on another vehicle having a movable portion, a movable inclined guide for guiding said ball member into said socket, said movable portion of the ball socket being carried by said movable inclined guide, and a stationary continuation of the movable inclined guide, said inclined guide and said stationary continuation having side walls converging toward the socket to act a guide for the ball member during the coupling operation.

In witness whereof I affix my signature.

MATT PAYNE.